Oct. 30, 1951    D. B. HENNESSY    2,573,102
AUTOMOILE CLOTHES RACK
Filed June 15, 1949

INVENTOR.
DAVID B. HENNESSY.
BY Howard J. Whelan.
ATTORNEY.

Patented Oct. 30, 1951

2,573,102

UNITED STATES PATENT OFFICE 2,573,102

AUTOMOBILE CLOTHES RACK

David B. Hennessy, Baltimore, Md.

Application June 15, 1949, Serial No. 99,209

1 Claim. (Cl. 224—42.42)

This invention relates to equipment for vehicles and more particularly to a clothes carrier for automobiles having doors to compartments intended primarily for the storage of items of a miscellaneous character.

In the construction of an automobile body of conventional form, there is provision for a compartment at the rear, but no provision has been made to support extra clothing worn during the trip, other than placing them on hangers in full view from the outside. This is unsightly as well as being an invitation to thieves to break into the car. This compartment has a door that is hinged at the top and opens upwardly thereon. As the door is of dished-out form there is room or space in it that is not available for any practical use, and may be said to be going to waste. In this invention, provision is made to use this space adequately and particularly for the storage of suits of clothes and items of a similar nature. To do this, a particular form of grille of strong material is made to fit on the inside face of the door and be held securely in place thereon. The attachment of the grille is preferably provided for by the use of hooks and springs fitting into projections or openings in the door structure and serves as an adjustable frame allowing a space between it and the inside surface of the door.

It is therefore an object of this invention to provide a new and improved grille or rack for the doors of an automobile that can be readily attached and made capable of retaining articles of clothing between the door and the rack.

Another object of this invention is to provide a new and improved grille or rack that will increase the capacity of the rear compartment of an automobile for holding articles of clothing, blankets, and similar articles, close to the surface of its door.

Other objects will become apparent as the invention is more fully described.

For a clearer understanding of the invention, its objects and the principles thereof, reference is made to the accompanying drawings. These drawings in conjunction with the following description outline a particular form of the invention, by way of example, while the claim emphasizes its scope.

In the drawings.

Similar reference numerals refer to the same parts throughout the drawings.

Figure 1:
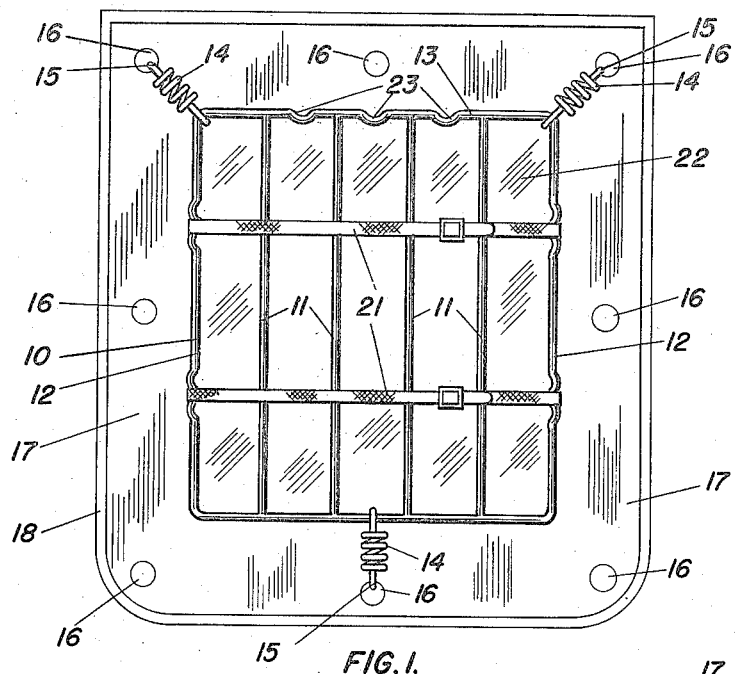
Figure 1 is a view of the automobile clothes carrier embodying this invention, looking in the direction of arrows 1—1 of Figure 3.
Figure 2:
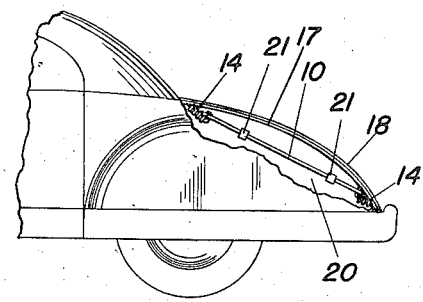
Figure 2 is a side view of an automobile trunk compartment with parts broken away to show the position of the clothes carrier shown in Figure 1 when the trunk door is closed.
Figure 3:
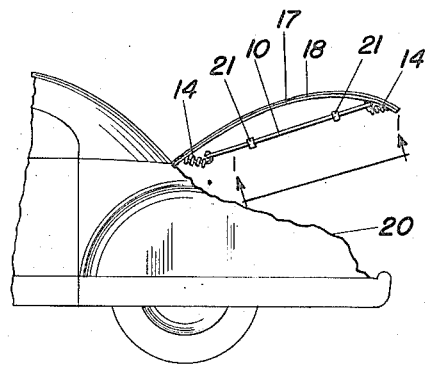
Figure 3 shows the position of the clothes carrier when the trunk door is opened.
Figure 4:
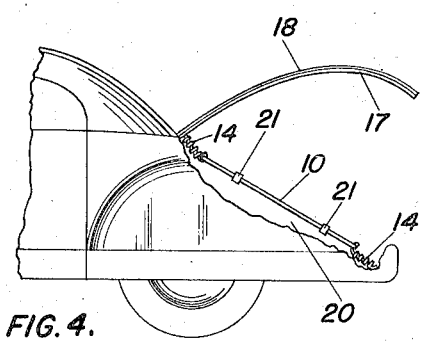
Figure 4 shows the trunk door in open position, and the clothes carrier at its bottom end open position so the clothing can be easily removed therefrom.

In the particular structure indicated in the drawings, a grille or rack 10, consists of a series of rods 11 preferably of metal or other strong material running longitudinally between sides 12 of the grille or rack 10. The top 13 has coil springs 14 having end hooks 15 incorporated in them adapted for insertion in holes 16 commonly included in the inner metal lining 17 of the trunk door 18 of an automobile. The hooks 15 are arranged at two places of the same side of the top 13 and one at the middle of the opposite or bottom side as shown in the drawings. The hooks 15 being resiliently attached afford considerable adjustability to the frame and allow clothing, such as suits to be laid on the frame and held against the lining in an effective manner. The two hooks on the same side serve as hinges to allow the rack to be lowered without detaching, so that the clothing can be placed thereon or removed. After placement the clothing can be held by the rack by raising it and locking it with the third hook on the opposite side of the frame, to the door. Since the rack is resiliently held in place, it holds the items securely without unnecessary movement about on the rack. It keeps the items away from the floor of the compartment 20 and makes use of the wide and capacity space immediately under the door 18. This permits access to the other articles in the compartment without causing disturbance of the items under the rack. At the same time the clothing is readily obtainable at any time that it is required. The rack is light and can be economically made, and since it does not need any change in the structure of the conventional trunk door of an automobile, it can be readily adapted for use therewith. The rods or slats 11 can be made of round or flat material, and usually with straps 21 attachable transversely over the frame which serve to secure the clothing compactly and neatly in place. Where the articles to be suspended under the rack are liable to swell through the spacings between the rods, the use of a light cardboard or plastic board 22 may be included to keep them in place. The rods are preferably of non-rusting materials, and if brightness is desirable the use of rustless steel or chromium or aluminum can be employed. Indentations 23 in the top rail 13 center a clothes hanger placed thereon.

While but one general form of the invention is shown in the drawings and described in the specification, it is not desired to limit this application for patent to this particular form, as it is appreciated that other forms of construction could be made that would use the same principles and come within the scope of the appended claim.

Having thus described the invention, what is claimed is:

In combination with the trunk door of an automobile, a rack comprising a closed rectangular frame, a plurality of spaced rods extending between two opposite sides of the frame to form a holder for clothing, flexible means for attaching two adjacent corners of the frame to the underside of the trunk door and flexible means for attaching the medial portion of the side of the frame opposite said corners to the underside of the trunk door, all of said flexible means including a quick detachable connection, whereby the frame may be swung away from the trunk door upon detaching the last of the aforementioned flexible means, a board resting on said rods between the frame and the underside of the trunk door, and straps encompassing said frame and the clothing resting on the board.

DAVID B. HENNESSY.

REFERENCES CITED

The following references are of record in the file of this patent:

UNITED STATES PATENTS

| Number | Name | Date |
|---|---|---|
| 393,975 | Gordon | Dec. 4, 1888 |
| 1,434,350 | Collins | Oct. 31, 1922 |
| 1,601,937 | Burd | Oct. 5, 1926 |
| 1,632,568 | Sloane | June 14, 1927 |
| 1,696,029 | Chandler | Dec. 18, 1928 |
| 1,711,784 | Heiber | May 7, 1929 |
| 2,198,584 | Swably | Apr. 23, 1940 |
| 2,253,423 | Fellers | Aug. 19, 1941 |
| 2,320,856 | Ehlers | June 1, 1943 |
| 2,469,068 | Ford | May 3, 1949 |